Figures 1, 2:
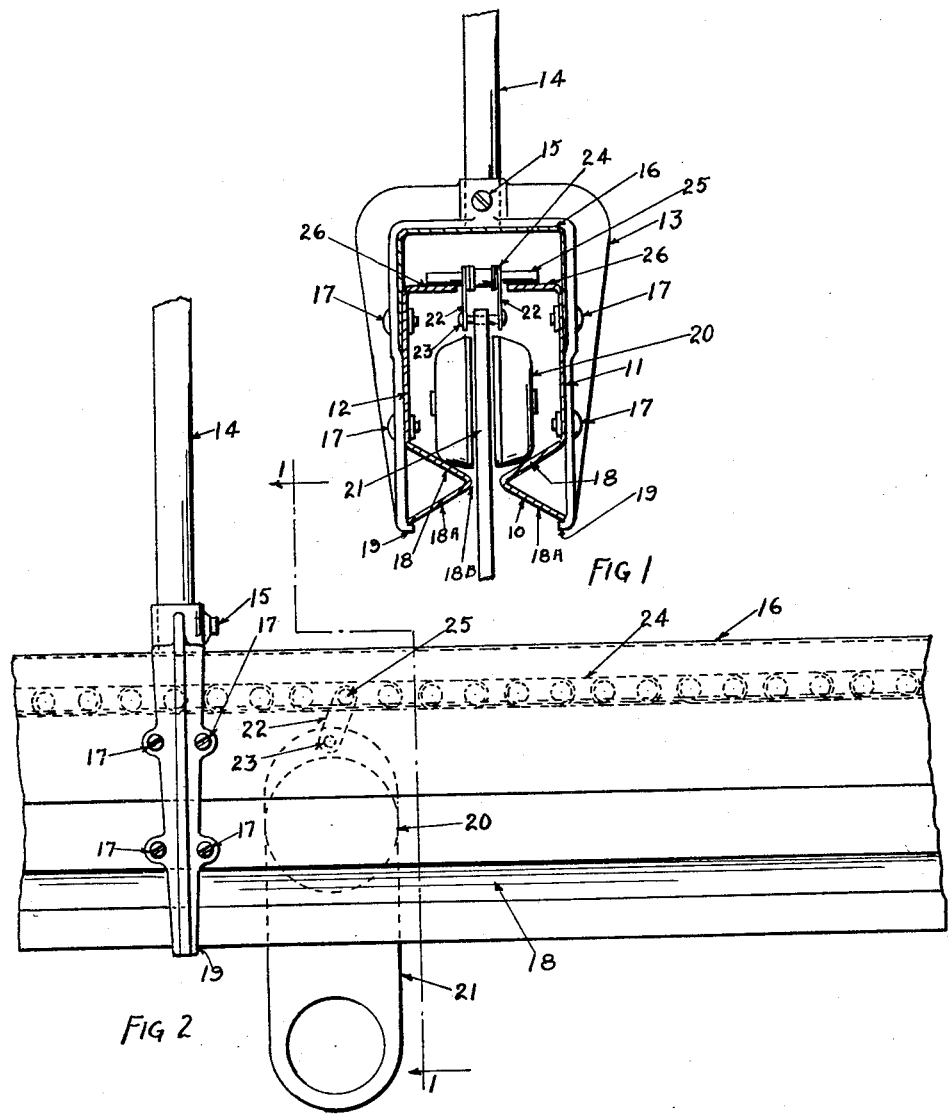

July 19, 1932.     C. S. HADDLESAY     1,867,883

MONORAIL TRACK FOR CONVEYER SYSTEMS

Filed March 10, 1931

Inventor
Charles S. Haddlesay.
By Jones, Addington, Ames & Seibold
Attys.

Patented July 19, 1932

1,867,883

UNITED STATES PATENT OFFICE

CHARLES S. HADDLESAY, OF ELMHURST, ILLINOIS

MONORAIL TRACK FOR CONVEYER SYSTEMS

Application filed March 10, 1931. Serial No. 521,494.

This invention relates to improvements in monorail tracks for conveyer systems where the load is suspended below the track and where the cars or trolleys travel in a slot in the underside of the track.

It is an object of my invention to provide a smooth and rounded guide or track for cars or trolleys.

A further object of my invention is to provide a rigid supporting rail or track on which the cars travel.

Other objects and advantages will be apparent from the accompanying description, setting forth in more detail such objects and advantages and the manner in which they are realized, and also from the accompanying drawing illustrating an embodiment of my invention.

In the drawing:

Figure 1 is a transverse sectional view taken on a line corresponding to line 1—1 of Fig. 2; and Fig. 2 is a side elevation of the track showing the car and the accompanying parts.

Referring to the drawing in detail, the embodiment illustrated comprises a track 10, formed of two side members 11—12 of a general sheet metal channel structure correctly spaced and held in place by a U-shaped member 13. The U-shaped member 13 also acts as a support for the track and is fastened to a rod 14 by a set screw 15.

A top plate 16 of sheet metal channel formation forms a cover for the chain or other power mechanism used to actuate the car 20.

The top plate or cover 16 has downwardly bent edges or flanges which are held between the side members 11—12, and the support member 13 by bolts 17.

The side members 11—12 have a V-shaped track or rail portion 18. The V-shaped track 18 has a double supporting flange 18ª and is supported by hooks 19, which are at the bottom of the supporting member 13.

A car 20 rides on the V-shaped tracks 18, the car 20 having a yoke 21 which extends downwardly between the tracks, the track 18 being spaced apart at 18ᵇ so that the bend of the V acts as a guide for the yoke 21. This V-shaped formation provides a smooth supporting surface for the wheels of the car and results in a strong rigid durable construction, not easily bent or distorted. The upper end of the yoke 21 has two links 22 which are pivoted to the yoke at 23 and are connected to a driving chain 24. The links 22 form a flexible connection between the driving chain and the yoke member 21, the driving chain being supported by a shaft or pintle 25 on inwardly extending flanges 26 which form parts of the side members 11—12, and serve as a track for the shaft 25.

While I have shown the trolleys 20 actuated by means of a power chain 24, any other suitable power means, such as a cord or wire, may be used. The track may also be used for gravity lines.

While only one specific embodiment of the present invention has been shown and described herein, it will be understood that various changes and modifications in the details of structure and arrangement of the parts may be made without departing from the spirit and scope of the invention, and I desire therefore that the same be limited only by the scope of the prior art and appended claims.

I claim:

1. A monorail conveyer system comprising a flexible conveyer element provided with conveyer supporting devices extending laterally therefrom, cars propelled by said conveyer element, and a combined car track and conveyer supporting construction comprising two opposed side channel members and an upper channel member, the flanges of one side member extending toward the flanges of the other side member but being spaced to provide clearance between the upper flanges and also between the lower flanges, the upper flanges supporting the lateral extensions of the conveyer element and the lower flanges supporting the cars, said upper channel member having its flanges extending downwardly and embracing the said channel members and serving as a housing for the flexible conveyer element, and spaced U-shaped supporting brackets having downwardly extending arms embracing and supporting said side sections.

2. A monorail conveyer system comprising a flexible conveyer element provided with conveyer supporting devices extending laterally therefrom, cars propelled by said conveyer element, and a combined car track and conveyer supporting construction comprising two opposed side channel members and an upper channel member, the flanges of one side member extending toward the flanges of the other side member but being spaced to provide clearance between the upper flanges and also between the lower flanges, the upper flanges supporting the lateral extensions of the conveyer element and the lower flanges supporting the cars, said upper channel member having its flanges extending downwardly and embracing the said channel members and serving as a housing for the flexible conveyer element, said lower flanges being provided with outwardly extending stiffening flange portions.

3. A monorail conveyer system comprising a flexible conveyer element provided with conveyer supporting devices extending laterally therefrom, cars propelled by said conveyer element, and a combined car track and conveyer supporting construction comprising two opposed side channel members and an upper channel member, the flanges of one side member extending toward the flanges of the other side member but being spaced to provide clearance between the upper flanges and also between the lower flanges, the upper flanges supporting the lateral extensions of the conveyer element and the lower flanges supporting the cars, said upper channel member having its flanges extending downwardly and embracing the said channel members and serving as a housing for the flexible conveyer element, said lower flanges being provided with outwardly extending stiffening flange portions, and spaced U-shaped supporting brackets having downwardly extending arms embracing said side sections and extension flanges.

In witness whereof, I have hereunto subscribed my name.

CHARLES S. HADDLESAY.